United States Patent Office 3,748,140
Patented July 24, 1973

3,748,140
LIGHT-SENSITIVE DIAZOTYPE MATERIAL
Hans-Dieter Frommeld and Herbert Rauhut, Wiesbaden-Biebrich, Germany, assignors to Keuffel & Esser Company, Morristown, N.J.
No Drawing. Filed Sept. 4, 1969, Ser. No. 855,422
Claims priority, application Germany, Sept. 3, 1968,
P 17 93 332.3
Int. Cl. C07c 113/04; G03c 1/54
U.S. Cl. 96—91 R
8 Claims

ABSTRACT OF THE DISCLOSURE

Diazotype material includes a light-sensitive diazonium compound of the general formula

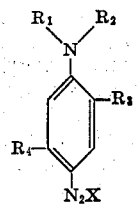

wherein $R_1$ is a lower alkyl group or an aralkyl group,
$R_2$ is a lower alkyl group, or
$R_1$ and $R_2$ together form a heterocyclic radical with the nitrogen atom;
$R_3$ is hydrogen, a lower alkoxy group, or a lower alkoxy group having at least one fluorine atom attached to the carbon in $\alpha$-position;
$R_4$ is halogen or a low alkoxy group having at least one fluorine attached to the carbon in $\alpha$-position; and
X is the anion of the diazonium compound;

and wherein only one of $R_3$ and $R_4$ is said fluorinated alkoxy group.

BACKGROUND OF THE INVENTION

U.S. Pat. 3,539,347 relates to a diazonium compound of the general formula

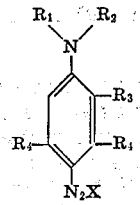

wherein $R_1$ and $R_2$ stand for unsubstituted or substituted alkyl, aralkyl, or cycloalkyl groups, or form an unsubstituted or substituted heterocyclic radical with the nitrogen atom;
$R_3$ stands for hydrogen, an alkoxy group, or a fluorinated alkoxy group;
$R_4$ and $R_5$ stand for hydrogen, halogen, or alkyl, alkoxy or fluorinated alkoxy groups; and
X is the anion of the diazonium compound;

and wherein at least one of the radicals $R_4$ and $R_5$ is hydrogen, and at least one of the radicals $R_3$, $R_4$, and $R_5$ is a fluorinated alkoxy group.

Further, the above-identified patent deals with the use of such compounds as light-sensitive substances in diazotype materials.

SUMMARY OF THE INVENTION

The present invention is concerned with benzene diazonium compounds which correspond to those of the noted general formula, but are characterized in that they contain at least one fluorinated alkoxy group containing at least one fluorine atom attached to the carbon atom in $\alpha$-position.

Further, the present invention relates to the use of such compounds as light-sensitive substances in diazotype material.

The benzene diazonium compounds according to the invention are distinguished from the corresponding compounds previously described by an increased coupling speed. Therefore, they are preferably used for one-component diazotype materials.

Compounds according to the present invention which have a relatively low coupling speed, i.e. compounds in which $R_1$ and $R_2$ are lower alkyl groups, may also be used in two-component diazotype materials.

Apart from their higher coupling speed, the compounds according to the present invention are very similar in their properties to the compounds described in the above-noted reference. They possess a good light-sensitivity, which is particularly high in such compounds in which $R_4$ or $R_5$ stands for a fluorinated alkoxy group.

The compounds according to the present invention are new. They may be prepared analogously to known processes. The fluorinated alkoxy groups may be introduced, e.g. by addition of fluorine-containing carbenes to phenols, by addition of phenolates to fluorinated olefins, by reaction of fluorinated alkyl chlorides or alkyl bromides with phenolate ions, or by replacing hydrogen atoms, halogen atoms, or other radicals, by fluorine atoms in phenol ethers. Reactions of this type are described, e.g. in Houben-Weyl: "Methoden der Organischen Chemie" (Methods of Organic Chemistry), vol. 5/3, p. 280; and vol. 6/3, p. 119.

The further steps of the synthesis are in analogy to known conventional methods for the preparation of light-sensitive diazonium compounds. The diazonium compounds are isolated in known manner in the form of their double salts with metal halides, e.g. with zinc chloride, cadmium chloride, or tin tetrachloride. Alternatively, the compounds may be separated in the form of their tetrafluoborates and hexafluophosphates, or as phosphates or sulfates, e.g.

The following are examples of fluorinated alkoxy radicals which are suitable, e.g. for the compounds of the present invention: —O—$CF_3$, —O—$CF_2H$,

—O—$CF_2$—$CF_2H$,

—O—$CF_2CF_3$, —O—CF=$CF_2$, —O—$CF_2$—CH($CF_3$)$_2$ or —O—$CF_2$—CFH—$CF_3$ groups.

In the following examples, the preparation and use of some of the compounds according to the present invention is illustrated:

EXAMPLE 1

A photoprinting base paper customarily used for diazotype purposes, which was provided on one side with a precoat of finely divided silica and polyvinyl acetate, was coated on its precoated side with an aqueous solution containing, per 100 ml. of solution:

| | G. |
|---|---|
| Citric acid | 0.5 |
| Sodium salt of naphthalene-1,3,6-trisulfonic acid | 3.5 |
| Gum arabic | 0.5 |
| 4-(N-methyl - N - benzyl - amino)-5-methoxy-2-(difluoromethoxy)-benzene diazonium chloride, in the form of the zinc chloride double salt (Formula 3) | 1.5 | and then dried.

The thus sensitized photoprinting material was imagewise exposed under a transparent original and developed with an aqueous solution containing, per 100 ml. of solution:

| | G. |
|---|---|
| Borax | 2.5 |
| Soda | 3.0 |
| Common salt | 2.0 |
| Thiourea | 5.0 |
| Sodium salt of isopropylnaphthalene sulfonic acid | 0.1 |
| Resorcinol | 0.6 |
| Phloroglucinol | 0.6 |

Dark red to brown images of good contrast were obtained.

The reproduction material is distinguished by its high light-sensitivity. The full shade of the coupling color was produced immediately after the developer had been applied. Substantially the same results were obtained when an equivalent quantity of 4-diethyl-amino-5-ethoxy-2-(1',1',2',2' - tetrafluoro-ethoxy)-benzene diazonium chloride, in the form of the zinc chloride double salt, (Formula 7) was used instead of the above-mentioned diazonium compound, the procedure being otherwise the same.

The compound corresponding to Formula 3 was prepared as follows:

4-methoxyphenol was etherified with difluoro-chloromethane in dioxane, in the presence of sodium hydroxide. By nitration and reduction, the 4-methoxy-3-amino-$\alpha,\alpha$-difluoro-anisole was prepared. This compound was acetylated, nitrated and then methylated with methyliodide and alkali. The acetyl group was split off by means of sulfuric acid and the secondary base obtained was benzylated. The 6 - nitro - 4 - methoxy-3-(methylbenzylamino)-$\alpha,\alpha$-difluoro-anisole (melting point 54° C.) was then reduced and diazotized, and the diazo compound was separated in the form of the zinc chloride double salt.

EXAMPLE 2

A photoprinting base paper customarily used for diazotype purposes carrying a precoat of finely divided silica and polyvinyl acetate, was coated on the precoated side with an aqueous solution containing, per 100 ml. of solution:

| | G. |
|---|---|
| Tartaric acid | 0.5 |
| Sodium salt of naphthalene-1,3,6-trisulfonic acid | 4.0 |
| Saponin | 0.02 |
| 4 - (N - methyl - N - benzyl-amino)-2-chloro-5-(difluoromethoxy) - benzene - diazonium tetrafluoborate (Formula 2) | 1.8 | and then dried.

The sensitized photoprinting material was imagewise exposed under a transparent original and developed with an aqueous solution which contained, per 100 ml. of solution:

| | G. |
|---|---|
| Phloroglucinol | 0.33 |
| Trisodium citrate | 9.60 |
| Sodium benzoate | 2.42 |
| Adipic acid | 1.98 |
| Common salt | 5.70 |
| Sodium salt of a dialkyl-naphthalene sulfonic acid | 0.20 | and had a pH-value of about 6.

Bluish-black images appeared within a shorter time after application of the developer solution than when using 4 - (N - methyl - N - benzyl-amino)-2-chloro-5-(2',2',2'-trifluoro-ethoxy)-benzene diazonium tetrafluoborate as the diazonium compound.

An equally good material with substantially higher light-sensitivity was produced when the above-identified diazonium compound of the invention was replaced by the 4-piperidino - 5 - methoxy-2-(1',1',2',2'-tetrafluoroethoxy)-benzene diazonium chloride, in the form of the zinc chloride double salt (Formula 4), and the method described above was used.

The coupling speed of the known zinc chloride double salt of 4-piperidino-2,5-diethoxy-benzene diazonium chloride is much too low for the compound to be suitable for neutral semi-wet development.

The compound corresponding to Formula 2 was prepared as follows:

4-chloro-phenol was etherified with benzyl chloride and then nitrated. The nitro group was reduced, the amine was acetylated, and the product thus obtained was again nitrated. The 4-chloro-5-nitro-2-acetylamino-phenyl-benzyl-ether thus obtained (melting point 150° C.) was methylated with methyl iodide in the presence of alkali. The acetyl group was split off by means of alkali, and the benzyl group was split off by means of acid. The resulting phenol was again etherified in dioxane with potassium hydroxide and difluoro-chloro-methane. The resulting 4-chloro - 5 - nitro - 2 - methylamino-$\alpha,\alpha$-difluoro-anisole (melting point 127° C.) was benzylated at the nitrogen atom and then reduced and diazotized. The diazo compound was separated in the form the tetrafluoroborate.

EXAMPLE 3

White photoprinting base paper provided with a precoat of finely divided silica and polyvinyl acetate, was coated with a solution of the following composition, and then dried:

| | G. |
|---|---|
| Citric acid | 4.0 |
| Thiourea | 5.0 |
| 2-hydroxy-3-naphthoic acid ($\beta$ - morpholinoethyl)-amide | 1.4 |
| 4 - diethylamino - 2 - (1',1',2',2'-tetrafluoroethoxy)-benzene diazonium chloride (in the form of the zinc chloride double salt) (Formula 6) | 1.6 |
| Water—100 ml. | |

After exposure under an original and development with ammonia, images with strong blue lines were obtained.

With this material, the full shade of the blue images was produced within a shorter time than when using either the zinc chloride double salt of 4-diethylamino-2-ethoxy-benzene diazonium chloride or the zinc chloride double salt of 4-diethylamino-2-(2',2',2'-trifluoro-ethoxy)-benzene diazonium chloride, in an otherwise identical mixture.

The following table lists a number of compounds according to the invention which have proved suitable for use in diazotype material.

TABLE

| Formula | $R_1$—N—$R_2$ | $R_3$ | $R_4$ | $R_5$ | X | Melting pt. of nitro comp. (° C.) |
|---|---|---|---|---|---|---|
| 1 | $CH_3$—N—$CH_3$ | $OCHF_2$ | Cl | H | Cl·1/2 $ZnCl_2$ | 63 |
| 2 | $CH_3$—N—$CH_2$—$C_6H_5$ | $OCHF_2$ | Cl | H | $BF_4$ | Oil |
| 3 | $CH_3$—N—$CH_2$—$C_6H_5$ | $OCH_3$ | $OCHF_2$ | H | Cl·1/2 $ZnCl_2$ | 54 |
| 4 | 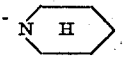 | $OCH_3$ | $OCF_2CHF_2$ | H | Cl·1/2 $ZnCl_2$ | 104 |
| 5 | Same as above | O-(n)$C_4H_9$ | $OCF_2CHF_2$ | H | Cl·1/2 $ZnCl_2$ | 71 |
| 6 | $C_2H_5$—N—$C_2H_5$ | H | $OCF_2CHF_2$ | H | Cl·1/2 $ZnCl_2$ | [1] 159 |
| 7 | $C_2H_5$—N—$C_2H_5$ | $OC_2H_5$ | $OCF_2CHF_2$ | H | Cl·1/2 $ZnCl_2$ | 76 |

[1] Melting point of the azo dyestuff formed with p-nitroaniline.

What is claimed is:

1. Diazotype material comprising a supported layer of a light-sensitive composition consisting essentially of a light-sensitive diazonium compound corresponding to the general formula:

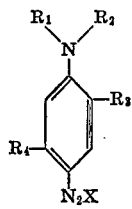

wherein
$R_1$ is a lower alkyl group or an aralkyl group,
$R_2$ is a lower alkyl group, or
$R_1$ and $R_2$ together form a piperidino radical with the nitrogen atom;
$R_3$ is hydrogen, a lower alkoxy group, or a lower alkoxy group having at least one fluorine atom attached to the carbon α-position;
$R_4$ is halogen or a lower alkoxy group having at least one fluorine atom attached to the carbon in α-position; and
X is the anion of the diazonium compound;
and wherein at least one, but only one, of $R_3$ and $R_4$ is said fluorinated alkoxy group.

2. Diazotype material according to claim 1 wherein said diazonium compound is 4-(N-methyl-N-benzyl-amino)-5-methoxy-5-(difluoromethoxy) - benzene diazonium chloride.

3. Diazotype material according to claim 1 wherein said diazonium compound is 4-diethyl-amino-5-ethoxy-2-(1',1',2',2'-tetrafluoro-ethoxy) - benzene diazonium chloride.

4. Diazotype material according to claim 1 wherein said diazonium compound is 4-(N-methyl-N-benzyl - amino)-2 - chloro-5-(difluoromethoxy)-benzene diazonium tetrafluoborate.

5. Diazotype material according to claim 1 wherein said diazonium compound is 4-piperidino-5-methoxy-2-(1',1',2',2'-tetrafluoro-ethoxy)-benzene diazonium chloride.

6. Diazotype material according to claim 1 wherein said diazonium compound is 4-diethylamino-2-(1',1',2',2'-tetrafluoro-ethoxy)-benzene diazonium chloride.

7. Diazotype material according to claim 1 wherein said diazonium compound is 4-dimethylamino-2-chloro-5-difluoromethoxy-benzene diazonium chloride.

8. Diazotype material according to claim 1 wherein said diazonium compound is 4-piperidino-5-n-butoxy-2-(1',1',2',2' - tetrafluoro-ethoxy)-benzene diazonium chloride.

References Cited
UNITED STATES PATENTS

| | | | |
|---|---|---|---|
| 3,539,347 | 11/1970 | Rauhut et al. | 96—91 R |
| 3,615,570 | 10/1971 | Werner et al. | 96—91 R |
| 3,563,752 | 2/1971 | Werner et al. | 96—91 R |
| 3,442,650 | 5/1969 | Hendrickx et al. | 96—91 |
| 3,459,550 | 8/1969 | Munder et al. | 96—91 |
| 3,459,551 | 8/1969 | Rauhut | 96—91 |
| 3,463,639 | 8/1969 | Baltazzi | 260—141 X |
| 3,493,374 | 2/1970 | Roncken et al. | 96—91 X |
| 3,493,377 | 3/1970 | Rauhut et al. | 96—91 |
| 3,498,790 | 3/1970 | Süs et al. | 260—141 X |
| 3,510,307 | 5/1970 | Borchers et al. | 96—91 X |
| 3,520,692 | 7/1970 | Knoester et al. | 260—141 X |
| 3,525,618 | 8/1970 | Keller et al. | 96—91 X |

CHARLES L. BOWERS, JR., Primary Examiner

U.S. Cl. X.R.
96—49; 260—141

UNITED STATES PATENT OFFICE
CERTIFICATE OF CORRECTION

Patent No. 3,748,140  Dated July 24, 1973

Inventor(s) HANS-DIETER FROMMELD, ET. AL.

It is certified that error appears in the above-identified patent and that said Letters Patent are hereby corrected as shown below:

On the cover sheet insert -- The portion of the term of this patent subsequent to Nov. 11, 1987, has been disclaimed. -- .

Signed and sealed this 21st day of January 1975.

(SEAL)
Attest:

McCOY M. GIBSON JR.
Attesting Officer

C. MARSHALL DANN
Commissioner of Patents